United States Patent
Tillotson

(10) Patent No.: US 7,929,466 B2
(45) Date of Patent: Apr. 19, 2011

(54) PRIORITIZED CHANNEL ASSIGNMENT FOR WIRELESS LINKS

(75) Inventor: Brian J. Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 878 days.

(21) Appl. No.: 11/843,533

(22) Filed: Aug. 22, 2007

(65) Prior Publication Data
US 2008/0095107 A1    Apr. 24, 2008

Related U.S. Application Data

(60) Provisional application No. 60/862,295, filed on Oct. 20, 2006.

(51) Int. Cl.
*H04J 1/16* (2006.01)
*H04L 12/56* (2006.01)

(52) U.S. Cl. .................. 370/278; 370/252; 370/329

(58) Field of Classification Search .................. 370/252, 370/278, 329
See application file for complete search history.

(56) References Cited

U.S. PATENT DOCUMENTS

| 7,729,244 | B2 * | 6/2010 | Sadr ............................. 370/230 |
| 2005/0262266 | A1 * | 11/2005 | Wiberg et al. ................ 709/238 |
| 2007/0133461 | A1 * | 6/2007 | Lenzini et al. ................ 370/329 |

FOREIGN PATENT DOCUMENTS

| WO | WO02061993 | 8/2002 |
| WO | WO02067514 | 8/2002 |
| WO | WO2005094041 | 10/2005 |

OTHER PUBLICATIONS

PCT Search Report and Written Opinion for Application No. PCT/US2007/022333, dated April 7, 2008, 15 pgs.

* cited by examiner

*Primary Examiner* — John Pezzlo
(74) *Attorney, Agent, or Firm* — Caven & Aghevli LLC

(57) ABSTRACT

Link capacity in a wireless medium is assigned by receiving at least one capacity request; and controlling the wireless link capacity based on at least the received capacity request. Link capacity is altered by reading priority information; creating a capacity request from the priority information read; transmitting the capacity request; receiving link configuration data; and configuring a wireless link to conform to the received allocation of link capacity. Link capacity is controlled by extracting the origin and priority of one or more packets received over the shared wireless medium; selecting the link capacity for one or more wireless links based at least in part on the extracted origin and priority of the one or more packets received, higher capacities are selected for origins from which higher priority packets are received; and transmitting the selected link capacity to the one or more wireless links.

16 Claims, 5 Drawing Sheets

| A | B | A | C | A | B | A | C | A | M |

Figure 7

| B | B | B | C | B | B | B | C | B | M |

Figure 8

PRIORITIZED CHANNEL ASSIGNMENT FOR WIRELESS LINKS

CROSS REFERENCE TO RELATED APPLICATIONS

This patent application claims the benefit of U.S. Provisional Application No. 60/862,295, filed Oct. 20, 2006, which provisional application is incorporated herein by reference.

BACKGROUND OF THE DISCLOSURE

1. Field of the Disclosure

The disclosure relates to the efficient use of the limited capacity of wireless links in a network and, more particularly, wireless systems, equipment, and methods that favor the transport of high-priority data first, regardless of which network node it comes from.

2. Description of the Related Art

In the past few years, both wired and wireless data networks have become common place and relatively inexpensive. These networks take many forms, use many different protocols, and carry a variety of data. For example, the data may represent voice, music, video, web pages, documents, files, bank/financial transactions, etc.

In a packet network that carries a variety of data, the delivery of some packets is more urgent than the delivery of other packets. The urgent packets have high priority (or high "quality of service", though that term encompasses more than priority).

For traditional wired networks, there are well-known mechanisms for managing multi-priority traffic flow. These mechanisms include integrated services (IntServ) or differentiated services (DiffServ) at the network layer of the OSI stack and Multiprotocol Label Switching (MPLS) at the link layer. In these mechanisms, each packet sent onto the network has a data field that defines its priority or type of service. For example, "type of service" is the name of the data field in an Internet Protocol packet.

Packets arriving at a network router or switch are placed in buffers (or queues) according to their priority. When the router's outgoing wire is not occupied, the router examines its buffers and forwards a packet from the highest-priority buffer that's not empty. In a simple case, for example, if there are four levels of priority with level 1 being most urgent, and a router currently has packets in buffers for levels 2 and 3, it will select a packet from the level 2 buffer and forward it to the next node in the network. Only when the buffers for priority levels 1 and 2 are empty will the router forward packets from the level 3 buffer. Most quality of service mechanisms, however, include fairness metrics and traffic metering systems to ensure that low-priority data streams are not completely blocked.

These prior-art mechanisms work well for wired networks where each wired link has constant capacity and its capacity is independent of other links. A problem arises, however, when the capacity of some links is small and the total capacity is shared among several links. This is often the case in wireless networks: a limited amount of spectrum is shared among several wireless links.

The capacity of a link is typically measured in bits per second. The link capacity is sometimes called the bandwidth of the link; however, the term "bandwidth" is more properly used for the spectral width of a channel, measured in Hertz.

Because existing network protocols are built on the assumption that each link has constant capacity that is independent of other links, many wireless networks enforce that assumption for wireless links. These networks are therefore inefficient at moving priority data.

Consider the case of two wireless nodes B and C in communication with node A. Node A connects to a wired network. One example of node A is a wireless access point. Nodes B and C each need to send 100 packets of data. For node B, 90 of its packets are priority 1 and 10 are priority 3. For node C, 90 of its packets are priority 2 and 10 are priority 4.

Using a wireless protocol like IEEE 802.11a, nodes B and C have equal access to the wireless medium via a scheme that uses carrier-sense multiple access with collision detection (CSMA/CD). Nodes B and C will attempt to send packets equally often. On average, both will transmit packets at about the same rate. Thus, the links from nodes B and C have about the same capacity even though node B is sending higher priority data. Consequently, the node C priority 2 data will be transferred over the network at the same rate as the node B priority 1 data. This problem arises because the two data flows originate at different nodes. The router on node B can forward the priority 1 data ahead of priority 3, but it cannot prevent node C from using half the capacity of the shared spectrum to transport priority 2 data.

In an attempt to address this problem, some wireless network protocols allow the network operator (or manager) to assign different priorities to each node regardless of the priority value in each packet's "type of service" field; the node priority is used to dynamically assign capacity to each link.

The IEEE 802.16 hub-and-spoke TDMA standard is an example of one of these protocols. Continuing our example with nodes A, B, and C, the network operator using the IEEE 802.16 protocol could assign node B a higher priority than node C. Nodes B and C each signal to node A that their buffers have many packets to send (802.16 includes a protocol for signaling buffer fullness). Node A, as the hub, assigns node B most of the TDMA slots because node B has higher priority. This works fine while node B is sending its 90 packets of priority 1 data. However, it is inefficient (from the perspective of sending data based on priority) when B runs out of priority 1 packets and starts sending priority 3 packets.

Consequently, the node-assigned-priority mechanism does not recognize the case where a high-priority node is sending only low-priority data. It gives node B more capacity as long as it has any packets to send, regardless of those packets' priority. This causes inefficient use of the available spectrum.

A third approach is taken in some wireless military networks. For example, the Link16 network assigns capacity in advance, e.g. by assigning TDMA slots to each node. This assures that each node gets some capacity. However, it does not make efficient use of spectrum since each node gets its full allocation, regardless of whether the data comes from a node that's currently not participating in combat operations or from a node that is receiving enemy fire and calling for help. Clearly the latter node should get priority, but a fixed-assignment network cannot dynamically reassign capacity to support the dynamic need.

The IntServ/RSVP protocol suite is slightly more dynamic. Rather than assigning all the network capacity before operation, RSVP allows a node to reserve capacity for a stream of packets whenever it wants to start a new stream. This assures that no authorized stream of packets will be blocked after it begins. However, if all the network capacity is reserved, RSVP does not allow a new stream to get any capacity, regardless of its priority.

Only human-in-the-loop, shared-capacity voice networks currently can dynamically allocate capacity based on priority. These are the classic push-to-talk voice radios used by pilots and Air Traffic Control, police, and many military forces.

When a user wants to transmit a voice message to another user, he or she waits until nobody else is talking, presses the button to talk, and begins talking; if two users begin talking at the same time, both stop and try again. (In this sense, the voice channel works like CSMA/CD.) Unlike 802.11a, however, there is a priority scheme for deciding who gets the most network capacity. If a pilot declares an emergency, other pilots stay off the channel as much as possible. Certain police codes, such as the one that means "shots fired, officer down", require other officers to clear the channel. In the US Army, a nuclear blast report has priority over all other messages. These human-to-human agreements allow efficient, rapid transmission of the most urgent voice messages over a shared channel with limited capacity.

Many products use wireless communication networks. The majority of these products transmit data whose priority (from the user perspective) varies dynamically. For example, an aircraft may periodically transmit data about the health of its on-board systems. While the systems are healthy, the transmission data rate is low and the priority of the transmission is low. Therefore, other users of the wireless spectrum should be able to use some of the network's capacity. However, when a system on the aircraft begins to fail, the aircraft may be programmed to transmit more data with higher priority so operators on the ground can assess whether it is safe to continue the flight. This is a common situation for unmanned aircraft and for flight tests of manned aircraft. During an event like this, more network capacity should be assigned the aircraft that is experiencing the failure, if necessary to meet the needs of the emergency. Consequently, other users of the wireless spectrum would get less capacity until the problem was resolved. However, current mechanisms do not enable capacity to be reassigned in an automated way.

Accordingly, there is a need for an automated wireless network carrying data with differing priorities and dynamic data rates to preferentially transport higher priority data.

BRIEF SUMMARY OF THE DISCLOSURE

The present disclosure addresses the problems identified above by providing methods, equipment and systems that can dynamically adjust a wireless network depending on the priority level of the data.

Embodiments disclosed include methods, equipment, or systems related to dynamically allocating shared wireless capacity. In some embodiments, this shared capacity may be allocated based on the priority of the data. In other embodiments the allocation could be based on the quantity of data at each priority level. In still other embodiments, the allocation may be based on the quantity of data at the highest priority level.

In one embodiment, a network controller receives one or more signals containing the priority of the packets in the transmit buffer or queue for one or more nodes in a wireless network. Based on the received signals, the network controller assigns link capacity to each node to achieve rapid transmission of high-priority packets.

Another embodiment includes: a wireless capacity assignment control that dynamically assigns capacity to various links in a shared spectrum resource, e.g. several links connected to a single wireless access point; a link layer mechanism that: i. buffers network packets for wireless transmission, ii. reads "type of service" fields (e.g. priority) embedded in the packets, and iii. occasionally sends wireless messages to the capacity assignment control informing it of the number of buffered packets for each type of service. A mechanism in the capacity assignment control receives buffer depth/priority messages from multiple nodes and applies an algorithm to assign capacity to each link.

An alternate embodiment uses a network layer protocol that sends queue-depth info, by priority level, to the next node or to a network capacity assignment manager. Those can assign bandwidth along the link.

Some embodiments provide a way to dynamically assign wireless capacity to links carrying high-priority network packets, where the priority of each packet is distinct from the priority of the node that transmits it. This improves efficiency and effectiveness of communication.

A method is disclosed for dynamically assigning link capacity in a shared wireless medium. This method includes extracting the origin and priority of one or more packets received over the shared wireless medium; selecting the link capacity for one or more wireless links based at least in part on the extracted origin and priority of the one or more packets received, higher capacities are selected for origins from which higher priority packets are received; and transmitting the selected link capacity to the one or more wireless links.

A method is also disclosed for dynamically assigning link capacity in a shared wireless medium. This method includes receiving at least one capacity request; and controlling wireless link capacity available to at least a first node based on at least the received capacity request.

A method is also disclosed for dynamically altering link capacity in a shared wireless medium. This method includes reading priority information from data in a buffer; creating a capacity request from the priority information read; transmitting the capacity request; receiving link configuration data, the link configuration data indicates at least an allocated link capacity; and configuring a wireless link to conform to the received allocation of link capacity.

The features, functions, and advantages that have been discussed can be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

The accompanying drawings incorporated in and forming part of the specification illustrate several aspects of the present disclosure. In the drawings:

FIG. 7 shows an initial set of CDMA channel assignments

FIG. 8 shows a set of CDMA channel assignments where most transmit slots are assigned to node B, allowing B to rapidly transmit its high-priority packets.

Reference will now be made in detail to various embodiments, examples of which are illustrated in the accompanying drawings.

DETAILED DESCRIPTION

Though "wireless" is often used to mean "radio", the term wireless as used herein means using any frequency in the electromagnetic spectrum or the acoustic spectrum to transmit or receive data without the use of a wire or a fiber. Thus, wireless links include, but are not limited to, radio links, optical links or acoustic links. Acoustic links are often used for underwater communication. Infrared links, one example of an optical link, are typically used in remote controls and have been used to transfer data between computers.

One embodiment may be employed as part of a hub-and-spoke wireless network. Other embodiments may be employed as part of other wireless network configurations. Code Division Multiple Access (CDMA), Time Division Multiple Access (TDMA), and Frequency Division Multiple Access (FDMA) are examples of wireless network transmission protocols.

Figure 1:
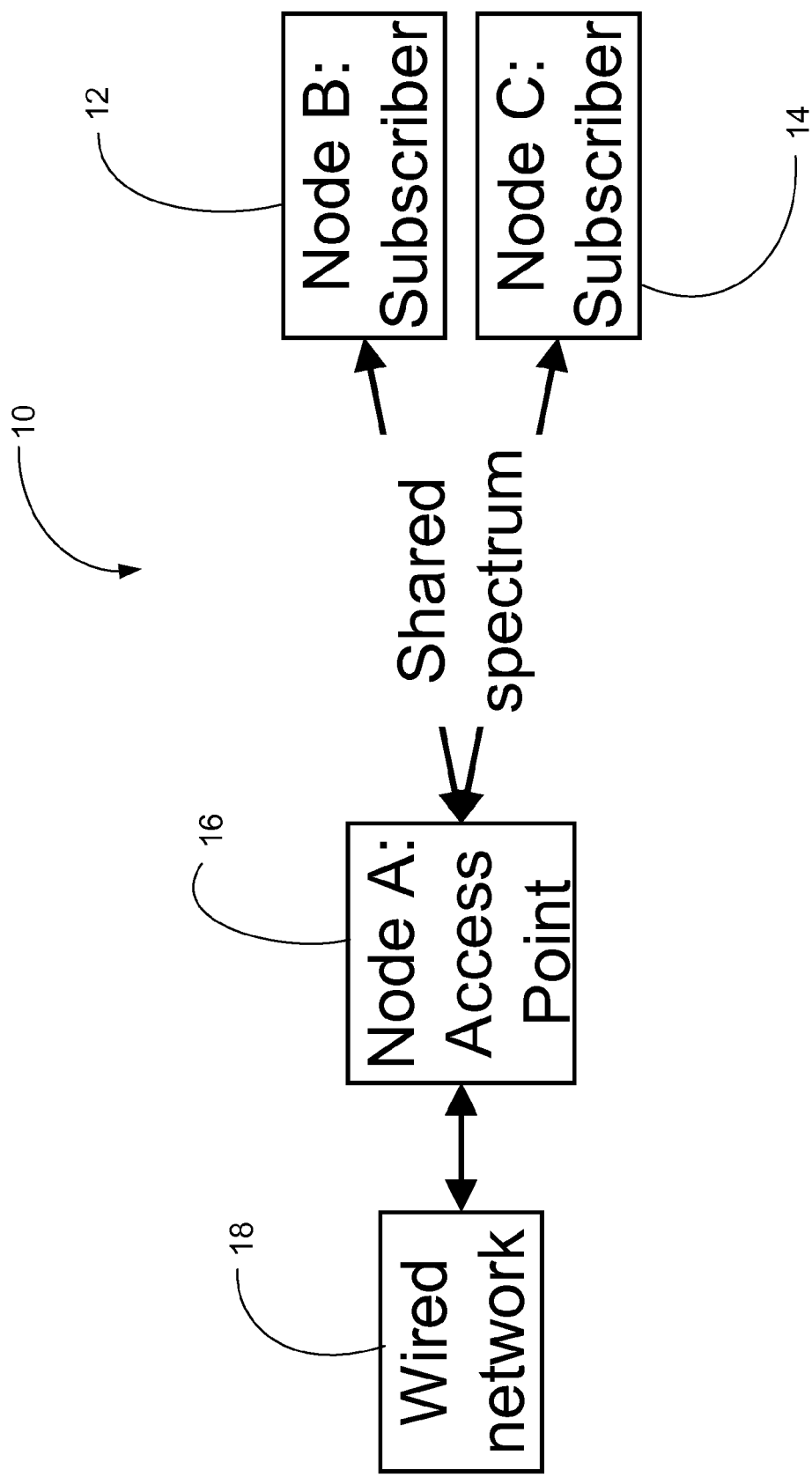
FIG. 1 illustrates a simple example of a hub-and-spoke wireless network where an embodiment could be employed.

A simple example of a wireless network 10 is shown in FIG. 1, where nodes B and C, reference numerals 12 and 14 respectively, communicate with node A, reference numeral 16, via a shared wireless resource or shared spectrum. Node A, reference numeral 16, is connected to a wired network 18 and therefore serves as an access point for nodes B and C. Nodes B and C, reference numerals 12 and 14 respectively, may be also referred to as subscriber nodes. The function of the access point node and the subscriber nodes will depend on the network and the embodiment employed.

The network shown in FIG. 1 allows packets to flow in two directions: from nodes B or C, reference numerals 12 and 14 respectively, to the wired network 18, and from the wired network 18 to nodes B or C, reference numerals 12 and 14 respectively. In some embodiments, the two directions of flow are handled differently, so they are described separately below. Traffic from B to C, in some embodiments, combines the two cases: a packet goes from node B to node A, reference numeral 16, and on to the wired network, where a router sends it via node A to node C. In other embodiments, packets may go directly from node B to node C or from node C to node B.

Figure 2:
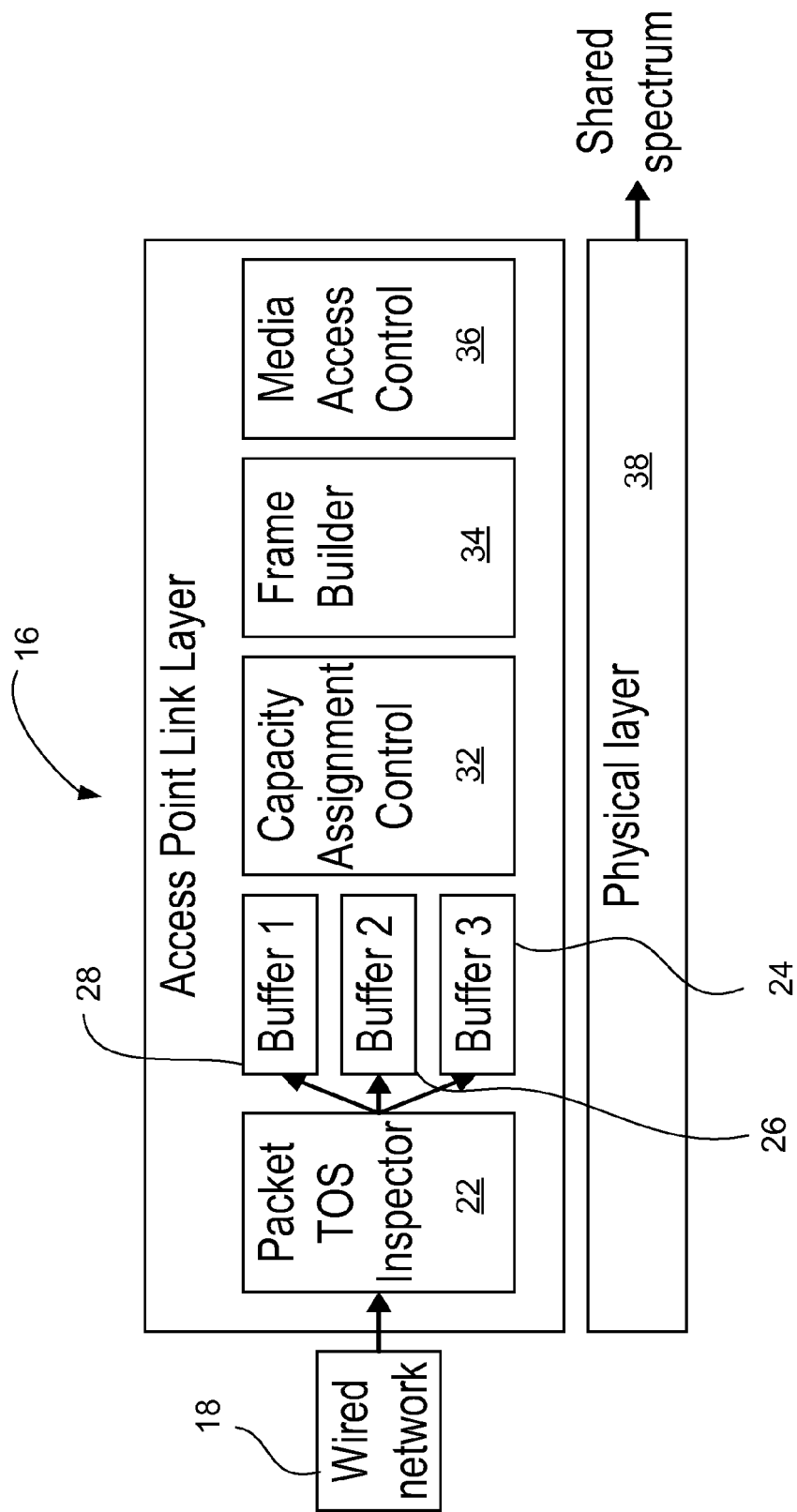
FIG. 2 shows components of an access point shown in FIG. 1 that employs an advantageous first embodiment.

FIG. 2 shows components of an access point using one embodiment. Packets enter from the wired network 18. The packet type of service (TOS) inspector 22 examines the "type of service" field of each packet and adds the packet to the appropriate buffer 24, 26, 28 for the packet's priority level. When the media access control 36 determines that it is almost time for node A, reference numeral 16, (access point) to transmit its next slot (or "frame") worth of data, it signals the frame builder 34. The frame builder 34 then removes packets from the buffers 24, 26, 28, starting with the highest priority non-empty buffer and using lower priority buffers when the high-priority buffers are empty. When the frame builder 34 has assembled a complete frame, it hands the frame to the physical layer 38. The physical layer 38 transmits the frame via the shared spectrum. The frame is received by the physical layer 42 (see FIG. 3) of nodes B and C, reference numerals 12 and 14 respectively, and passed to components on each node that extract packets from the frame and pass them to terminal devices on the node's internal network. In some protocols, the frame may have a MAC address that specifies node B or node C as the destination. In that case, the frame builder 34 fills a frame with packets destined only for node B, reference numeral 12, or node C, reference numeral 14; it uses a later frame to transmit packets to the other node.

Figure 3:
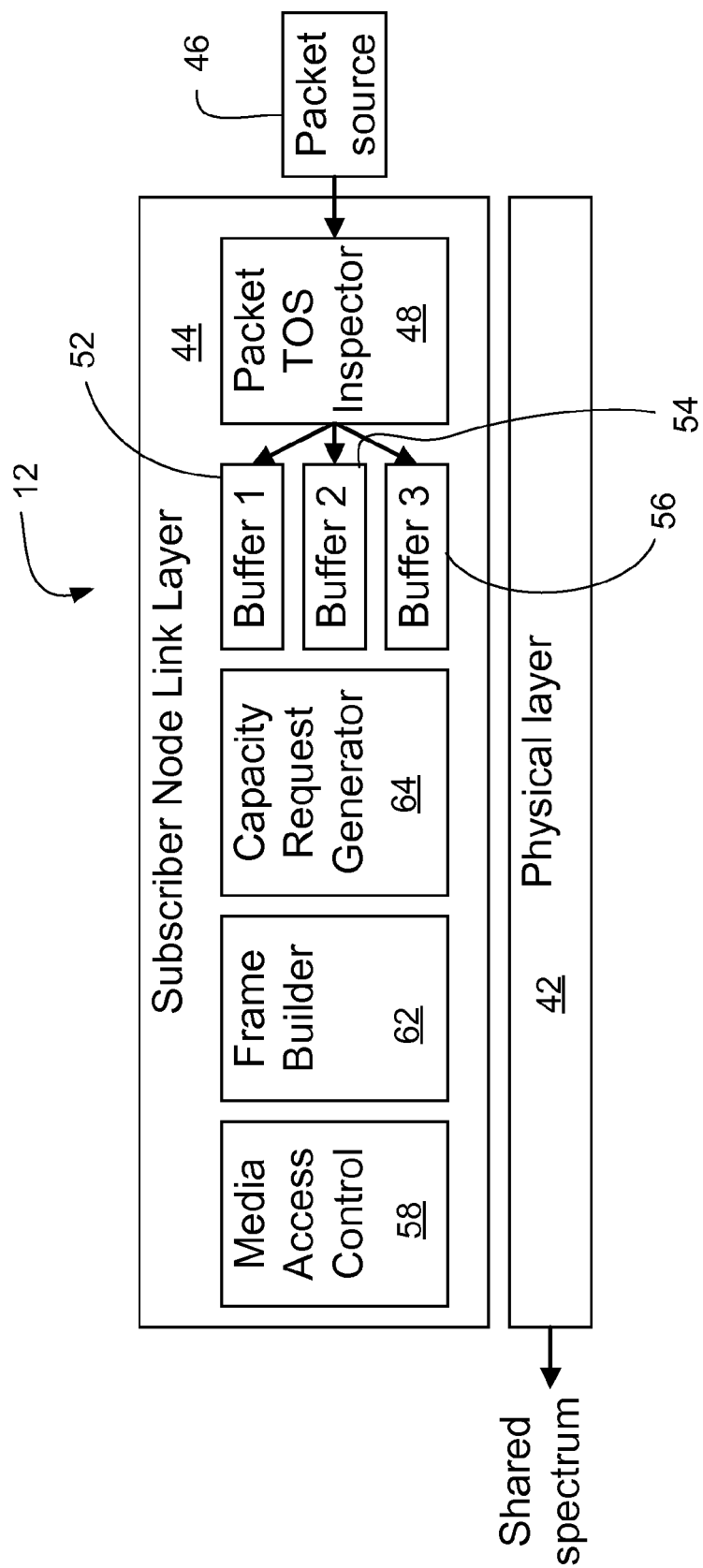
FIG. 3 shows link layer components of a subscriber node containing a second advantageous embodiment.

FIG. 3 shows link layer 44 components of a subscriber node using another embodiment. Let us assume it is node B, reference numeral 12. Packets enter the link layer 44 from devices within the node, shown as "Packet Source" 46. The packet TOS inspector 48 examines the "type of service" field of each packet and adds the packet to the appropriate buffer 52, 54, 56 for the packet's priority level. When the media access control 58 determines that it is almost time for node B to transmit its next slot (or "frame") worth of data, it signals the frame builder 62. The frame builder 62 then removes packets from the buffers 52, 54, 56, starting with the highest priority non-empty buffer and using lower priority buffers when the high-priority buffers are empty. When the frame builder 62 has assembled a complete frame, it hands the frame to the capacity request generator (CRG) 64. The capacity request generator 64 checks the number of packets remaining in each buffer and inserts those numbers into the frame header, described below. The CRG 64 then hands the frame to the physical layer 42. The physical layer 42 transmits the frame via the shared spectrum. The frame is received by the physical layer 38 of node A, reference numeral 16, and passed to components that 1) extract packets from the frame and pass them to the wired network, and 2) extract data from the frame header as described below.

Figures 4, 5, 6:
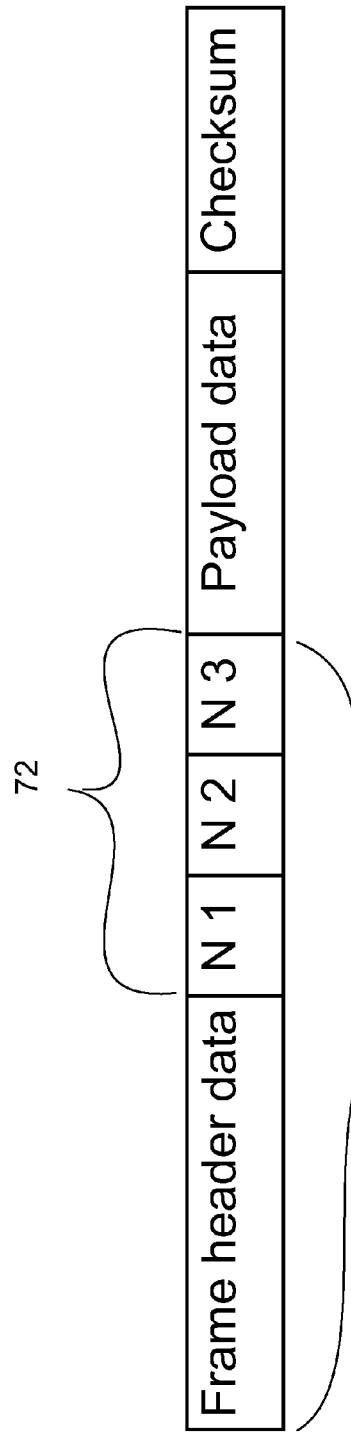
FIG. 4 illustrates a TDMA frame in accordance with one embodiment.
FIG. 5 shows slot assignments for transmissions from nodes A, B, and C in one TDMA epoch.
FIG. 6 shows the result of dynamically changing the slot assignments for transmissions from nodes A, B, and C in a TDMA epoch that follows the TDMA epoch shown in FIG. 5.

FIG. 4 shows an example of a frame built by the subscriber node's frame builder using one embodiment. The frame includes several elements common in the prior art, for example, various types of header data, such as MAC addresses or modulation data; the payload, i.e. packets to be transported; and a checksum to verify correct reception. In addition to the prior art header elements, one embodiment of the frame builder 62, adds a set of three values labeled N1, N2, and N3. These are the number of packets remaining in each of the three buffers 52, 54, 56.

In another embodiment, the frame builder 62, may add a single value representing the number of packets in the highest priority buffer. In a further embodiment, the frame builder 62, may add two values, each value representing the number of packets in each of the two highest priority buffers. Depending on the network and the embodiment employed the number of priority levels or the number of values can be more or fewer than three. One or more values in a header 74 of frame 76 are called a capacity request 72.

The value contained in each of the capacity request fields need not be an actual count of packets in each priority buffer. Thus in some embodiments, the value may be an indicator of the count. For example, the N1 field may be a two-bit value indicating that the top priority buffer is 75-100% full, 50-75% full, 25-50% full, or 0-25% full, while the N2 field may be a one-bit value indicating that the priority two buffer has at least one packet. In another embodiment, a single value representing the priority of packets in the highest priority buffer that contain packets may be employed. The use of a small number of bits for these fields reduces network overhead.

In some embodiments, frames sent from the access point, node A, reference numeral 16, do not contain these values.

When the frame reaches node A, reference numeral 16, the capacity assignment control 32 (FIG. 2) records the capacity request 72, e.g. the values N1, N2, and N3 in one embodiment. The capacity assignment control 32 also records the capacity request 72, e.g. the values N1, N2, and N3 in one embodiment, for frames from other nodes, e.g. node C, reference numeral 14. When it is time to build a new TDMA slot map for the next TDMA epoch, the capacity assignment control 32 uses the capacity requests 72, together with the current depth of buffers 1, 2, and 3, reference numerals 24, 26, 28, in node A, reference numeral 16, to determine which TDMA transmission slots should be assigned to which node. In general, nodes with more high-priority packets in their buffers will get more TDMA slots (i.e. more capacity) than nodes with fewer high-priority packets.

FIG. 5 shows slot assignments for transmissions from nodes A, B, and C, reference numerals 16, 12, 14 respectively, in one TDMA epoch. The assignment gives roughly equal access for traffic to and from node B, reference numeral 12 and to and from node C, reference numeral 14. Node A, reference numeral 16, gets twice as many transmit slots as B or C, but roughly half of A's transmissions go to each of the subscriber nodes. The "M" slot is used by node A to transmit the slot map for the next epoch.

Now consider a situation similar to the one described earlier: nodes B and C each need to send 100 packets of data from their buffers. Due to a problem on node B, 90 of its packets are priority 1 and 10 are priority 3. All of node C's packets are priority 2. These values are transmitted in the capacity requests 72 during the final slots sent from nodes B and C to node A in the current epoch. In reality, node A would need some time to process the capacity requests 72, e.g. the N1, N2, N3 values, to compute the new slot map. Therefore, the slot map would be computed using values sent prior to the last B or C slot in the epoch.

In this example, Node A has 20 packets at priority 3; ten are addressed to node B and ten to node C. The capacity assignment control 32 uses these values to determine how to assign slots in the next epoch. Since node B has lots of packets at priority 1 and node C has lots of packets at priority 2, the capacity assignment control 32 assigns most slots to node B, a few slots to node C, and none (other than the next slot map) to node A. FIG. 6 shows the slot map transmitted at the end of the epoch shown in FIG. 5.

In FIG. 6 a TDMA epoch is shown where most transmit slots are assigned to node B, allowing B to rapidly transmit its high-priority packets. In a later epoch, when the high-priority buffers of nodes B and C are nearly empty, the capacity assignment control 32 assigns some transmit slots to node A, reference numeral 16, so it can send its priority-3 packets. Note that the slot map, for this embodiment, never has zero slots for any subscriber node, since each subscriber node must be able to signal its buffer status.

In some embodiments, the capacity request 72 need not be included in every frame sent from a subscriber node. In other embodiments, the capacity request does not even need to be sent in every epoch. A further embodiment has a variable frame format where one bit in the frame header 74 determines whether the header includes the capacity request. The frame builder 62 only sets the bit and adds the capacity request when value or values in the capacity request have changed substantially from the last transmission of the capacity request, or when a specified amount of time has passed since the last transmission of the capacity request.

In some embodiments, the capacity request may be sent in a network packet rather than in a frame header 74. In this embodiment, the capacity request generator 64 does not insert the fields into a frame header 74, but creates a network packet containing the capacity request. This packet could be sent periodically, on demand, or when required by a change in buffer depth. The capacity request generator 64 addresses the packet to the capacity assignment control 32, and inserts the packet into the transmit buffer. When the packet reaches the capacity assignment control 32, the capacity request 72 is used to compute the next TDMA slot map. Since this embodiment does not include additional information in the frame header, a conventional frame builder may be used to build the frames.

Some embodiments can be used with phased array antennas (a.k.a. electronically steered antennas). In an embodiment with phased arrays, node A usually cannot transmit the slot map to node B and node C simultaneously, so there must be at least one slot in each epoch for node A to transmit to each individual subscriber node.

Some embodiments can be used with an algorithm to compute new slot maps (or frequency maps, channel maps, etc.) from the capacity request values e.g. N1, N2, etc. The prior art is rich in algorithms used to smooth the flow of certain types of network traffic, or to provide fair access to low and high priority traffic; the embodiments can use the same or similar algorithms in the capacity assignment control.

In some embodiments, the capacity assignment control can be implemented as a software application running outside of node A. In this embodiment, node A's link layer may act as a slave to the capacity assignment control, which sends commands to node A via the wired or wireless network. Alternatively, another node's link layer may be used as the slave to the capacity assignment control.

In some embodiments, the network can use a peer-to-peer mesh structure rather than hub-and-spoke. An example of a peer-to-peer TDMA network is disclosed in U.S. patent application Ser. No. 09/998,556. This application is incorporated herein by reference. In a Peer-to-peer network, each node may have both a capacity assignment control and a capacity request generator. Alternatively, only specified nodes may have both a capacity assignment control and a capacity request generator.

In one embodiment, a particular packet's priority can be treated differently depending on the node the packet is coming from. For example, node B and node C might both have 20 packets in their priority 2 buffers, but the Capacity Assignment Control may treat node B's priority 2 as higher priority than node C's priority 2.

The medium access strategy need not be TDMA. Alternate embodiments can use any shared access protocol. For example, with FDMA the capacity assignment control dynamically assigns frequency channels to each link rather than time slots. Thus, the capacity assignment control occasionally sends out a new frequency map to tell subscriber nodes that the assignments are about to change. CDMA may be used in another embodiment.

CDMA (Code Division Multiple Access) uses mathematically orthogonal patterns of modulation to encode distinct communication channels at each transmitter. To receive a particular channel, a receiver multiplies the incoming signal (which contains all channels) by one of the orthogonal patterns (called a code). Each code is associated with one channel.

With CDMA, the capacity assignment control dynamically assigns one or more code channels to each link (rather than one or more time slots for each link, as in TDMA). The capacity assignment control occasionally sends out a new channel map to tell subscriber nodes that the assignments are about to change. The time at which to implement the new assignment may be specified as part of the channel map, or may be implicitly specified by a rule known to all nodes, e.g. "any new channel map becomes active at the start of the next second."

Figures 7, 8:
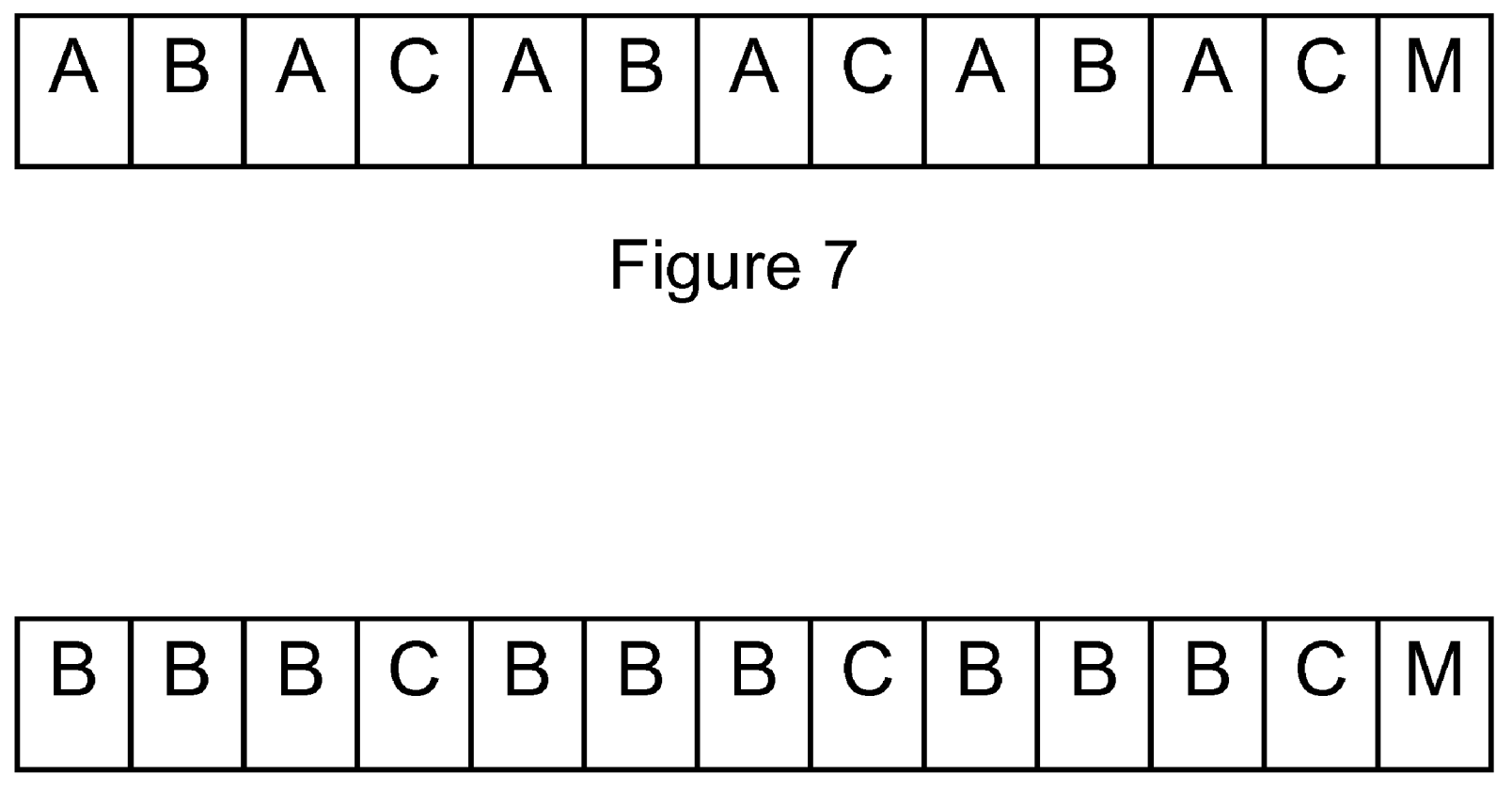

FIG. 7 shows an initial set of channel assignments for a CDMA channel map with equal number of channels assigned for each direction in each link. The "M" channel is used by node A to transmit updated channel maps, in addition to any other link management directives.

In some embodiments, each CDMA subscriber node has a control message builder. The CDMA control message builder builds a link control message which contains an identifier that marks the message as a capacity request. In one embodiment, the capacity request contains the three values N1, N2, and N3.

As discussed above for the TDMA example, the capacity request may have additional values or fewer values.

When the capacity request reaches node A or the location of the capacity assignment control, the capacity assignment control records the values contained in the capacity request. The capacity assignment control also records the values in the capacity requests from other nodes, e.g. node C. The capacity assignment control uses the capacity requests to determine whether to update any CDMA channel assignments.

To illustrate this in action, consider the initial channel assignment shown in FIG. 7. This channel map gives roughly equal access for traffic to and from node B and to and from node C. Node A gets twice as many transmit channels as B or C, but roughly half of A's transmissions go to each of the subscriber nodes.

Now, nodes B and C each need to send 100 packets of data from their buffers. Due to a problem on node B, 90 of its packets are priority 1 and 10 are priority 3. All of node C's packets are priority 2. These values are transmitted in capacity requests from nodes B and C to node A. Node A has 20 packets at priority 3; ten are addressed to node B and ten to node C.

The capacity assignment control uses these values to determine how to assign channels. Since node B has lots of packets at priority 1 and node C has lots of packets at priority 2, the capacity assignment control assigns most channels to node B, a few channels to node C, and none (other than the next channel map) to node A. FIG. 8 shows the new channel map. This is the channel map transmitted to all subscriber nodes.

FIG. 8 shows a CDMA channel map where most channels are assigned to node B, allowing B to rapidly transmit its high-priority packets. In a later epoch, when the high-priority buffers of nodes B and C are nearly empty, the capacity assignment control assigns some channels to node A so it can send its priority-3 packets. Note that the channel map never has zero channels for any subscriber node, since each subscriber node must be able to signal its buffer status.

The above embodiments use a capacity request generator at the subscriber node to send packet priority information for packets waiting to be transmitted, to the access capacity assignment control. In an alternative embodiment, a capacity request generator is not required. In this embodiment, the capacity assignment control monitors the origin and packet priority of some or all of the packets received from wireless nodes at an access point or one of the other wireless nodes. Based on the information obtained while monitoring the wireless network traffic, the capacity assignment control sets the capacity for one or more wireless links. This embodiment has the advantage of not requiring changes to the subscriber nodes. However, this embodiment, in some situations, will respond slower to changes in the packet priority from a wireless node, since the capacity assignment control would not have information/data on the packet priority for packets to be transmitted in the future, but instead would base capacity assignments on the priority of packets already transmitted.

In summary, numerous benefits are described which result from employing the concepts of the disclosure. The foregoing description of an exemplary embodiments is presented for the purposes of illustration and description. It is not intended to be exhaustive or to limit the embodiments to the precise form disclosed. Obvious modifications or variations are possible in light of the above teachings. The embodiments were selected and described in order to best illustrate the principles of the disclosure and its practical application to thereby enable one of ordinary skill in the art to best utilize the disclosure in various embodiments and with various modifications as are suited to particular uses contemplated. It is intended that the scope of the disclosure by defined by the claims appended hereto.

I claim:

1. A method for dynamically assigning link capacity in a shared wireless medium, the method comprising:
   receiving at least one capacity request; and
   controlling wireless link capacity available to at least a first node based on at least the received capacity request, wherein the capacity request comprises a value that indicates the quantity of data buffered at a highest priority level.

2. The method of claim 1 wherein controlling wireless link capacity comprises:
   allocating wireless link capacity based on at least the capacity request; and
   sending link configuration data to at least the first node, the link configuration data indicates at least a link capacity allocated to at least the first node.

3. The method of claim 1, wherein the capacity request further comprises a value that indicates the quantity of data buffered at a second highest priority level.

4. The method of claim 3, wherein the capacity request further comprises a value that indicates the quantity of data buffered at a third highest priority level.

5. The method of claim 2, wherein the capacity request further comprises a value that indicates if data is buffered at a second highest priority level.

6. The method of claim 1, wherein the capacity request is received from header data that is part of a link frame.

7. The method of claim 1, where the capacity request is received from a network packet.

8. A method for dynamically altering link capacity in a shared wireless medium, the method comprising:
   reading priority information from data in a buffer;
   creating a capacity request from the priority information read;
   transmitting the capacity request;
   receiving link configuration data, the link configuration data indicates at least an allocated link capacity; and
   configuring a wireless link to conform to the received allocation of link capacity, wherein the capacity request comprises a value that indicates the quantity of data buffered at a highest priority level.

9. The method of claim 8, wherein the capacity request further comprises a value that indicates the quantity of data buffered at a second highest priority level.

10. The method of claim 9, wherein the capacity request further comprises a value that indicates the quantity of data buffered at a third highest priority level.

11. The method of claim 8, wherein the capacity request further comprises a value that indicates if data is buffered at a second highest priority level.

12. The method of claim 8, wherein the capacity request is transmitted in header data that is part of a link frame.

13. The method of claim 8, where the capacity request is transmitted in a network packet.

14. A method for dynamically assigning link capacity in a shared wireless medium, the method comprising:
   receiving at least one capacity request, wherein the capacity request comprises a value that indicates if data is buffered at a second highest priority level; and
   controlling wireless link capacity available to at least a first node based on at least the received capacity request, wherein controlling wireless link capacity comprises:
      allocating wireless link capacity based on at least the capacity request; and
      sending link configuration data to at least the first node, the link configuration data indicates at least a link capacity allocated to at least the first node.

15. The method of claim 14, wherein the capacity request comprises at least one of a value that indicates the quantity of data buffered at a highest priority level, or a value that indicates the quantity of data buffered at a second highest priority level.

16. The method of claim 14, wherein the capacity request is received from at least one of a header data that is part of a link frame or a network packet.

* * * * *